(12) United States Patent
Takahashi

(10) Patent No.: US 10,792,958 B2
(45) Date of Patent: Oct. 6, 2020

(54) PNEUMATIC TIRE

(71) Applicant: TOYO TIRE & RUBBER CO., LTD., Osaka-shi, Osaka (JP)

(72) Inventor: Toshihiko Takahashi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 397 days.

(21) Appl. No.: 15/492,061

(22) Filed: Apr. 20, 2017

(65) Prior Publication Data

US 2018/0009273 A1    Jan. 11, 2018

(30) Foreign Application Priority Data

Jul. 8, 2016    (JP) ................................. 2016-135797

(51) Int. Cl.
*B60C 13/02* (2006.01)
*B60C 11/01* (2006.01)

(52) U.S. Cl.
CPC .............. *B60C 13/02* (2013.01); *B60C 11/01* (2013.01)

(58) Field of Classification Search
CPC ....... B60C 13/02; B60C 13/00; B60C 13/001; B60C 13/002; B60C 11/01
See application file for complete search history.

(56) References Cited

U.S. PATENT DOCUMENTS

| | | | |
|---|---|---|---|
| 6,533,007 B1 | 3/2003 | McMannis | |
| D578,956 S * | 10/2008 | Dixon | ..................... B60C 11/01 D12/579 |
| 2008/0210355 A1* | 9/2008 | Harvey | ................... B60C 11/01 152/209.8 |
| 2010/0038001 A1 | 2/2010 | Yamaguchi | |

(Continued)

FOREIGN PATENT DOCUMENTS

| | | |
|---|---|---|
| JP | 2004-291936 A | 10/2004 |
| JP | 2010-264962 A | 11/2010 |

(Continued)

OTHER PUBLICATIONS

Office Action dated Dec. 25, 2018, issued in counterpart CN Application No. 201710129737.7, with English translation (18 pages).

(Continued)

*Primary Examiner* — Steven D Maki
*Assistant Examiner* — Philip N Schwartz
(74) *Attorney, Agent, or Firm* — Westerman, Hattori, Daniels & Adrian, LLP

(57) ABSTRACT

A tread portion is provided with a first block and a second block, which protrudes outward in a tire width direction more than the first block, alternately in a tire circumferential direction in a shoulder region. A first projection is provided in an outer side of the first block, and a second projection is provided in an outer side of the second block. An outside end of the second projection is connected to a side surface of the (Continued)

second block and is arranged closer to an outer side in the tire diametrical direction than an outside end of the first projection. An angle $\theta 1$ formed by a side surface of the first projection and a surface of the side wall portion is greater than an angle $\theta 2$ formed by a side surface of the second projection and the surface of the side wall portion.

18 Claims, 5 Drawing Sheets

(56) References Cited

U.S. PATENT DOCUMENTS

2010/0288409 A1    11/2010  Ohara
2013/0139936 A1     6/2013  Ohara

FOREIGN PATENT DOCUMENTS

JP         2013-119277 A      6/2013
JP         2013-249065 A     12/2013

OTHER PUBLICATIONS

The Office Action dated May 30, 2019, issued in counterpart CN application No. 201710129737.7, with English translation. (14 pages).
Office Action dated Oct. 9, 2019, issued in counterpart CN Application No. 201710129737.7, with English translation. (16 pages).
Zhan, Yiming et al., "RTR also uses it Nitto Taerra Grappler G2", http://www.modiauto.com.cn/html/parts/1071/28960.html, Dec. 4, 2014, Cited in CN Office Action dated Oct. 9, 2019, with English translation. (6 pages).

* cited by examiner

PNEUMATIC TIRE

BACKGROUND OF THE INVENTION

Field of the Invention

The present invention relates to a pneumatic tire aiming at traveling on a punishing road such as a muddy terrain and a rocky stretch.

Description of the Related Art

With regard to the pneumatic tire aiming at the traveling on the punishing road, there has been known a technique that a side wall portion is provided with a plurality of projections which are arranged along a tire circumferential direction (refer, for example, to patent documents 1 to 3 filed by the applicant of the present application). According to the technique, in a scene traveling on a muddy terrain, a sand pip and a snowy road, a traction is generated by a shear resistance of the projections and it is possible to improve a punishing road traveling property.

The inventor of the present invention have devoted himself to making a study and have derived a technique of further improving a punishing road traveling property by configuring such that a block in a shoulder region of a tread portion generates a traction in cooperation with the projection. However, in the configuration mentioned above, since fluctuation of a rubber volume becomes large in a so-called buttress region, it has been known that an increase of dynamic unbalance is caused.

Patent document 4 describes a pneumatic tire in which a side wall portion is provided with a plurality of projections arranged along a tire circumferential direction. However, this is a technique for cooling a side wall reinforcing layer which is provided in a run-flat tire, and does not suggest any solving means for the problem of the traction on a punishing road and the dynamic unbalance mentioned above.

PRIOR ART DOCUMENT

Patent Document

Patent Document 1: JP-A-2004-291936
Patent Document 2: JP-A-2010-264962
Patent Document 3: JP-A-2013-119277
Patent Document 4: JP-A-2013-249065

SUMMARY OF THE INVENTION

The present invention is made by taking the above actual condition into consideration, and an object of the present invention is to provide a pneumatic tire which can lower dynamic unbalance while improving a punishing road traveling property by enhancing traction.

Means for Solving the Problems

The object can be achieved by the following present invention. The present invention provides a pneumatic tire comprising a pair of bead portions, side wall portions which extend outward in a tire diametrical direction from the bead portions, and a tread portion which is connected to an outside end in the tire diametrical direction of each of the side wall portions, wherein the tread portion is provided with a first block and a second block, which protrudes outward in a tire width direction more than the first block, alternately in a tire circumferential direction in a shoulder region, wherein the side wall portion is provided with a first projection which is provided in an outer side in the tire width direction of the first block, and a second projection which is provided in an outer side in the tire width direction of the second block, wherein each of the first projection and the second projection extends in the tire diametrical direction, wherein an outside end in the tire diametrical direction of the second projection is connected to a side surface of the second block and is arranged closer to an outer side in the tire diametrical direction than an outside end in the tire diametrical direction of the first projection, and wherein an angle θ1 formed by a side surface of the first projection and a surface of the side wall portion is larger than an angle θ2 formed by a side surface of the second projection and the surface of the side wall portion.

In the pneumatic tire, on the basis of the second block which protrudes outward in the tire width direction more than the first block, and the first projection and the second projection which extend in the tire diametrical direction, the traction can be generated in the scene traveling on the muddy terrain. Further, since the outside end in the tire diametrical direction (which may be, hereinafter, called simply as "outside end") of the second projection is connected to the side surface of the second block and is arranged in the outer side in the tire diametrical direction more than the outside end of the first projection, the second block and the second projection cooperate and generate great shear resistance, and can improve the punishing road traveling property by enhancing the traction. Further, since the angle θ1 and the angle θ2 satisfy the magnitude relationship mentioned above, the dynamic unbalance can be lowered by making the fluctuation of the rubber volume in the buttress region.

It is preferable that the outside end in the tire diametrical direction of the first projection has the same height as a groove bottom of a lateral groove which comparts the first block, or is positioned closer to an inner side in the tire diametrical direction of the groove bottom. According to the configuration mentioned above, the traction caused by the shear resistance of the second projection can be well generated by appropriately separating the outside end of the first projection from the outside end of the second projection.

It is preferable that the outside end in the tire diametrical direction of the second projection is positioned closer to an inner side in the tire diametrical direction than a surface of the second block. According to the configuration mentioned above, it is effective for suppressing the generation of the irregular wear (particularly the heel and toe wear and the shoulder-drop wear) which is caused by the second block.

It is preferable that an inside end in the tire diametrical direction of the second projection is positioned closer to an outer side in the tire diametrical direction than an inside end in the tire diametrical direction of the first projection. According to the configuration mentioned above, a difference in length between the first projection and the second projection in the tire diametrical direction does not become too great, and it is possible to well reduce dynamic unbalance.

It is preferable that the angle θ1 is between 110 and 135 degrees, and the angle θ2 is between 80 and 110 degrees. The rigidity of the first projection can be well secured by setting the angle θ1 as mentioned above. The angle θ2 is relatively small, however, since the angle θ2 is set to the vicinity of 90 degrees as mentioned above, the rigidity of the second projection is not lowered very much. Therefore, according to the configuration mentioned above, it is possible to well generate the traction caused by the shear resistance of the first projection and the second projection.

DETAILED DESCRIPTION OF THE PREFERRED EMBODIMENTS

Figure 1:
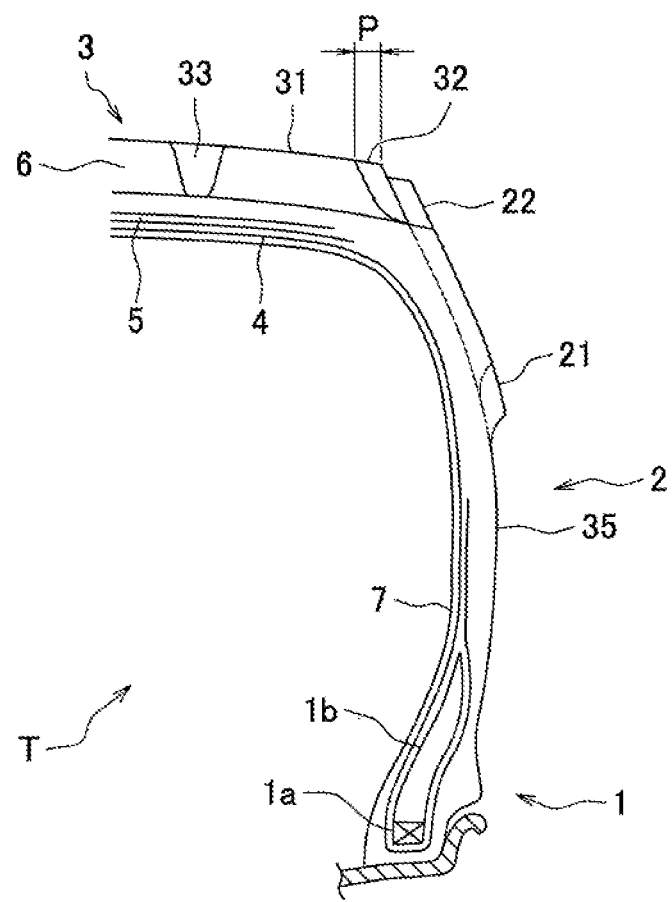
FIG. 1 is a tire meridian half cross sectional view schematically showing an example of a pneumatic tire according to the present invention.
Figure 2:
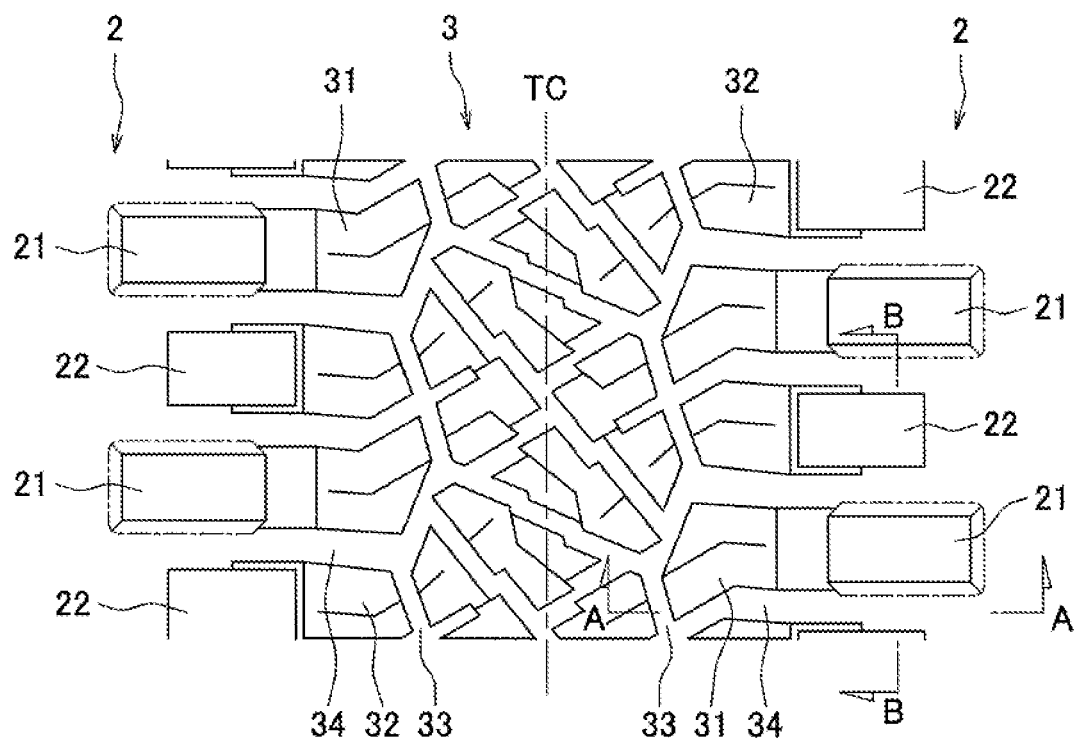
FIG. 2 is a development view in a plan view and shows a tread portion and a side wall portion of the tire.
Figure 3:
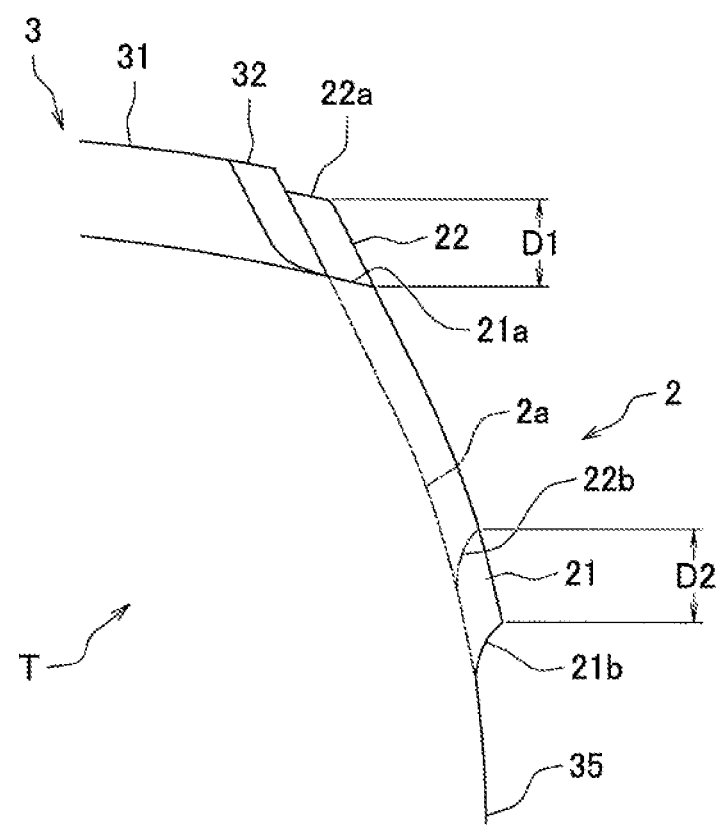
FIG. 3 is a cross sectional view showing an outer profile shape of a substantial part of the tire.

A description will be given below of an embodiment according to the present invention with reference to the accompanying drawings. FIG. 1 is a tire meridian half cross sectional view schematically showing an example of a pneumatic tire according to the present invention, and corresponds to a cross section along a line A-A in FIG. 2. FIG. 2 is a development view in a plan view and shows a tread portion and a side wall portion of the tire. FIG. 3 is a cross sectional view showing an outer profile shape of a substantial part of the tire.

A pneumatic tire T is an off-road pneumatic radial tire aiming at traveling on a punishing road which includes a muddy terrain and a rocky stretch. The tire T is provided with a pair of bead portions 1, side wall portions 2 which extend outward in a tire diametrical direction from the bead portions 1, and a tread portion 3 which is connected to an outside end in the tire diametrical direction of each of the side wall portions 2. The bead portion 1 is provided with an annular bead core 1a which covers with rubber a convergence body such as a steel wire, and a bead filler 1b which is arranged in an outer side in the tire diametrical direction of the bead core 1a.

The pneumatic tire T is further provided with a carcass 4 which is arranged between a pair of bead portions 1, and a belt 5 which is arranged in an outer periphery of the carcass 4 in the tread portion 3. The carcass 4 is formed into a toroidal shape as a whole, and is wound up its end portion in such a manner as to pinch the bead core 1a and the bead filler 1b. The belt 5 is constructed by two belt plies which are layered inward and outward, and is provided with a tread rubber 6 in its outer peripheral side. A tread pattern including main grooves 33 and lateral grooves 34 is formed on a surface of the tread rubber 6.

An inner liner 7 is provided in an inner peripheral side of the carcass 4 for keeping pneumatic pressure. The inner liner 7 faces to an internal space of the tire T in which air is filled. In the side wall portion 2, the inner liner 7 is directly attached to an inner peripheral side of the carcass 4, and any other member is not interposed between them.

The tread portion 3 is provided with first blocks 31 and second blocks 32, which protrude to an outer side in a tire width direction more than the first blocks 31, alternately in a tire circumferential direction, in a shoulder region. The shoulder region is a region including a ground end which is positioned in an outer side in the tire width direction of the tread portion 3. The first blocks 31 and the second blocks 32 are respectively sectioned by main grooves 33 which extend along the tire circumferential direction, and lateral grooves 34 which extend across the main grooves 33. A tread pattern of the other regions is not particularly limited as long as the blocks mentioned above are provided in the shoulder region.

In the present embodiment, the first blocks 31 and the second blocks 32 are alternately arranged one by one along the tire circumferential direction as shown in FIG. 2, and a ground end side edge of a whole of the tread rubber 6 is formed into a concavo-concave shape along the tire circumferential direction. A distance from a tire equator TC to the ground end side edge of the second block 32 is greater than a distance from the tire equator TC to the ground end side edge of the first block 31, and a difference between them corresponds to a protruding amount P of the second block 32. In order to well obtain traction caused by shear resistance of the second block 32, the protruding amount P is preferably equal to or more than 1.5 mm.

The side wall portion 2 is provided with a first projection 21 which is provided in an outer side in a tire width direction of the first block 31, and a second projection 22 which is provided in an outer side in the tire width direction of the second block 32. The first projection 21 and the second projection 22 bulge from a surface 2a of the side wall portion 2 along a profile line of the tire T in a so-called buttress region. The buttress region is a region of an outer side in the tire diametrical direction of the side wall portion 2, and is a portion which does not ground at the normal traveling time on a flat paved road. Since the tire sinks down due to a weight of the vehicle on a soft road such as a muddy terrain and a sand pit, the buttress region grounds in a pseudo manner.

As shown in an enlarged manner in FIG. 3, each of the first projection 21 and the second projection 22 extends in the tire diametrical direction. More specifically, the first projection 21 extends between a tire diametrical outside end 21a (hereinafter, referred to as an outside end 21a) and a tire diametrical inside end 21b (hereinafter, referred to as an inside end 21b), and the second projection 22 extends between a tire diametrical outside end 22a (hereinafter, referred to as an outside end 22a) and a tire diametrical inside end 22b (hereinafter, referred to as an inside end 22b). The outside end 22a of the second projection 22 is connected to a side surface of the second block 32, and is arranged in an outer side in the tire diametrical direction than the outside end 21a of the first projection 21.

In the tire T, in a scene traveling on the soft road such as the muddy terrain, the sandpit and the snowy road, the traction is generated by the shear resistance of the second block 32, the first projection 21 and the second projection 22. Further, since the outside end 22a of the second projection 22 protruding to the outer side in the tire diametrical direction than the first projection 21 is connected to the side surface of the second block 32 protruding to the outer side in the tire width direction than the first block 31, the second block 32 and the second projection 22 cooperate and generate great shear resistance. As a result, it is possible to improve a punishing road traveling property by enhancing the traction.

Figure 4:
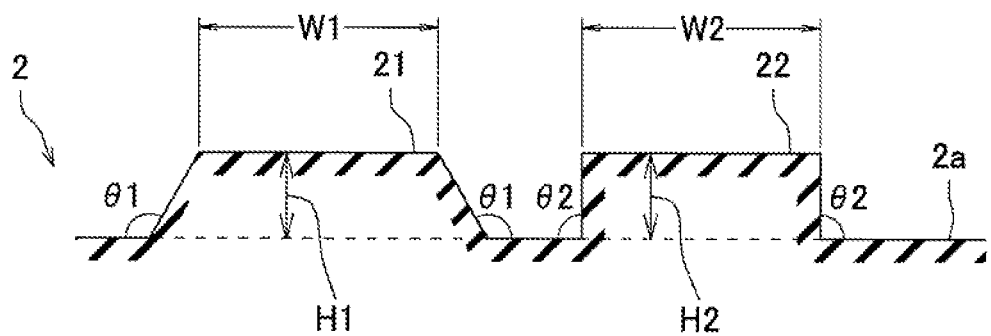
FIG. 4 is a cross sectional view of a first projection and a second projection.

FIG. 4 is a cross sectional view of the first projection 21 and the second projection 22, and corresponds to a cross section along a line B-B in FIG. 2. In the present embodiment, a cross section of the first projection 21 is formed into a quadrangular shape, and more particularly formed into a trapezoidal shape which is widened toward a surface 2a. Further, in the present embodiment, a cross section of the second projection 22 is formed into a quadrangular shape and more particularly to a rectangular shape. An angle θ1 formed by a side surface of the first projection 21 and the surface 2a of the side wall portion 2 is set to be larger than an angle θ2 formed by a side surface of the second projection 22 and the surface 2a of the side wall portion 2.

The outside end 22a of the second projection 22 protruding outward in the tire diametrical direction more than the first projection 21 is connected to the side surface of the second block 32 protruding outward in the tire width direction more than the first block 31, fluctuation of a rubber volume along a tire circumferential direction tends to be larger in a buttress region. However, in the tire T, since a magnitude relationship between the angle θ1 and the angle θ2 is set as mentioned above, it is possible to reduce the dynamic unbalance by achieving uniformity of the robber volume in the buttress region.

Further, in a scene traveling on a rocky stretch, since the first projection 21 and the second projection 22 act so as to keep an external damage factor (for example, an angular portion of a rock face) away from the surface 2a of the side wall portion 2, the tire T is excellent in external damage resistance. The first projection 21 and the second projection 22 may be provided at least in one side wall portion 2, however, are preferably provided in both the side wall portions 2, in the light of improvement of a punishing road traveling property and the external damage resistance.

For appropriately separating the outside end 21a from the outside end 22a, the outside end 21a of the first projection 21 is preferably positioned closer to an inner side in a tire diametrical direction than a half of a depth of a lateral groove 34 which comparts the first block 31, and is more preferably positioned at the same height as a groove bottom of the lateral groove 34 or closer to the inner side in the tire diametrical direction than the groove bottom. In the present embodiment, the outside end 21a is positioned at the same height as the groove bottom of the lateral groove 34, and is not connected to the side surface of the first block 31. A distance D1 between the outside end 21a and the outside end 22a in the tire diametrical direction is set, for example, to 3.0 to 20.0 mm.

The outside end 22a of the second projection 22 is arranged closer to an outer side in the tire diametrical direction than the groove bottom of the lateral groove 34, and is connected to the side surface of the second block 32 as already mentioned. In the present embodiment, the outside end 22a of the second projection 22 is positioned closer to the inner side in the tire diametrical direction than the surface of the second block 32, and the surface of the second block 32 and the outside end 22a of the second projection 22 form a step. As a result, since the ground width does not become too wide, it is possible to suppress the generation of the irregular wear (particularly the heel and toe wear and the shoulder-drop wear) caused by the second block 32.

In the present embodiment, the inside end 22b of the second projection 22 is positioned closer to the outer side in the tire diametrical direction than the inside end 21b of the first projection 21. As a result, a difference in length between the first projection 21 and the second projection 22 in the tire diametrical direction does not become too large, the dynamic unbalance can be well reduced by suppressing fluctuation of a rubber volume in the buttress region. A distance D2 between the inside end 21b and the inside end 22b in the tire diametrical direction is set, for example, to 3.0 to 20.0 mm. A difference between the distance D1 and the distance D2 is preferably equal to or less than 10.0 mm.

In the present embodiment, each of the inside end 21b and the inside end 22b is arranged closer to the outer side in the tire diametrical direction than a tire maximum width position 35. The tire maximum width position 35 is a position where a profile line of the tire T is most away from the tire equator TC in the tire width direction. The profile line is a profile line which forms an outer surface of the side wall portion 2 except the projections and the like, and normally has a meridian cross sectional shape which is set by smoothly connecting a plurality of circular arcs.

In the present embodiment, the inside end 21b is formed by a concave circular arc surface, and a height of the first projection 21 is gradually reduced toward the inner side in the tire diametrical direction in the inside end 21b. As a result, generation of a crack is suppressed in a root of the first projection 21. In the same manner, since the inside end 22b is formed by a concave circular arc surface, generation of a crack is suppressed in a root of the second projection 22.

In the present embodiment, the first projection 21 and the second projection 22 are segmentalized in the tire circumferential direction and are formed independently from each other as shown in FIG. 2, however, are not limited to this. A height H1 of the first projection 21 on the basis of the surface 2a of the side wall portion 2 is approximately fixed from an edge of the outside end 21a to an edge of the inside end 21b. In the same manner, a height H2 of the second projection 22 is approximately fixed from an edge of the outside end 22a to an edge of the inside end 22b. The difference between the height H1 and the height H2 is preferably equal to or less than 2.5 mm, and the height H1 and the height H2 are substantially identical in the present embodiment. In the light of improvement of the punishing road traveling property and the external damage resistance, each of the height H1 and the height H2 is preferably equal to or more than 5 mm, and more preferably equal to or more than 8 mm.

A width W1 of the first projection 21 in the tire circumferential direction is preferably equal to or shorter than a length of a ground end side edge of the first block 31 which is adjacent to the first projection 21. Further, a width W2 of the second projection 22 in the tire circumferential direction is preferably equal to or shorter than a length of a ground end side edge of the second block 32 which is adjacent to the second projection 22. In the present embodiment, since the first projection 21 and the second projection 22 do not protrude in the tire circumferential direction out of the ground end side edges of the blocks which are adjacent to each other as shown in FIG. 2, discharge of mud entering into the lateral groove 34 is not prevented. The difference between the width W1 and the width W2 is preferably equal to or less than 5.0 mm, and the width W1 and the width W2 are substantially identical in the present embodiment.

The angle θ1 is preferably between 110 and 135 degrees, and the rigidity of the first projection 21 is well secured accordingly. Since the shear resistance of the first projection 21 becomes small by making the angle θ1 too large, the angle θ1 is preferably set to be equal to or less than 135 degrees. The angle θ2 is preferably between 80 and 110 degrees, and the rigidity of the second projection 22 is not lowered very much by setting the angle θ2 in the vicinity of 90 degrees. Therefore, it is possible to well generate the traction on the basis of the shear resistance of the first projection 21 and the second projection 22, by setting the angles as mentioned above. The difference (θ1−θ2) between the angle θ1 and the angle θ2 is preferably set to be equal to or more than 10 degrees, and more preferably set to be equal to or more than 20 degrees.

In the present embodiment, the cross sectional shape of the first projection 21 and the second projection 22 are flat as shown in FIG. 4, the width W1 is greater than the height H1, and the width W2 is greater than the height H2. Further, in the present embodiment, the angles θ1 are the same each other in the side surfaces in both sides of the first projection 21, and the angles θ2 are the same each other in the side surfaces in both sides of the second projection 22, however, they may be differentiated. However, even in the case, each of the angles θ1 and the angles θ2 is desirably within the above range, and each of the angles θ1 is set to be greater than the respective angles θ2.

Each of the dimensional values mentioned above is measured in a no-load normal state in which the tire is installed to a normal rim and a normal internal pressure is filled in the tire. The normal rim is a rim which is defined by a standard for every tire in a standard system including the standard on which the tire is based, for example, a standard rim in JATMA, "Design Rim" in TRA or "Measuring Rim" in ETRTO. Further, the normal internal pressure is a pneumatic pressure which is defined by each of the standards for every tire in the standard system including the standard on which the tire is based, and is a maximum pneumatic pressure in JATMA, the maximum value described in Table "TIRE LOAD LIMITS AT VARIOUS COLD INFLATION PRESSURES" in TRA, or "INFLATION PRESSURE" in ETRTO.

Since the pneumatic tire according to the present invention has the operations and effects as mentioned above and can improve the punishing road traveling property, the pneumatic tire can be preferably employed in a light truck such as a pickup truck for an off-road racing aiming at traveling on the punishing road including the muddy terrain and the rocky stretch, and for a vehicle dispatched to a disaster site.

The pneumatic tire according to the present invention can be configured in the same manner as the regular pneumatic tire except the provision of the block in the shoulder region of the tread portion and the projection in the side wall portion as mentioned above. Therefore, the conventionally known materials, shapes, structures and manufacturing methods can be employed in the present invention.

The present invention is not limited to the embodiment mentioned above, but can be variously modified and changed within the range which does not deflect from the scope of the present invention.

EXAMPLES

A description will be given below of examples which particularly indicate the configuration and the effect of the present invention. Evaluation of each of performances of the tire was carried out by the following items (1) and (2).
(1) Punishing Road Traveling Property A pneumatic tire having a size LT265/70R17 was installed to an actual car (foreign-made pickup truck), and a time required for traveling for 5 km on the punishing road including the muddy terrain was measured. The tire was assembled in a rim of 17×7.5 JJ, a pneumatic pressure of front wheels was set to 420 kPa, and a pneumatic pressure of rear wheels was set to 520 kPa. The results were evaluated by an index number in which the result of a comparative example is defined as 100, and the smaller numerical value indicates the more excellent punishing road traveling property.
(2) Dynamic Unbalance The dynamic unbalance was measured by a dynamic balance inspection device (manufactured by KOKUSAI CO., LTD., Type: Model FDB6142) while using the tire mentioned above. The result was evaluated by an index number in which the result of the comparative example is defined as 100, and the smaller numerical value indicates the lower dynamic unbalance and the more excellent dynamic unbalance.

Figure 5:
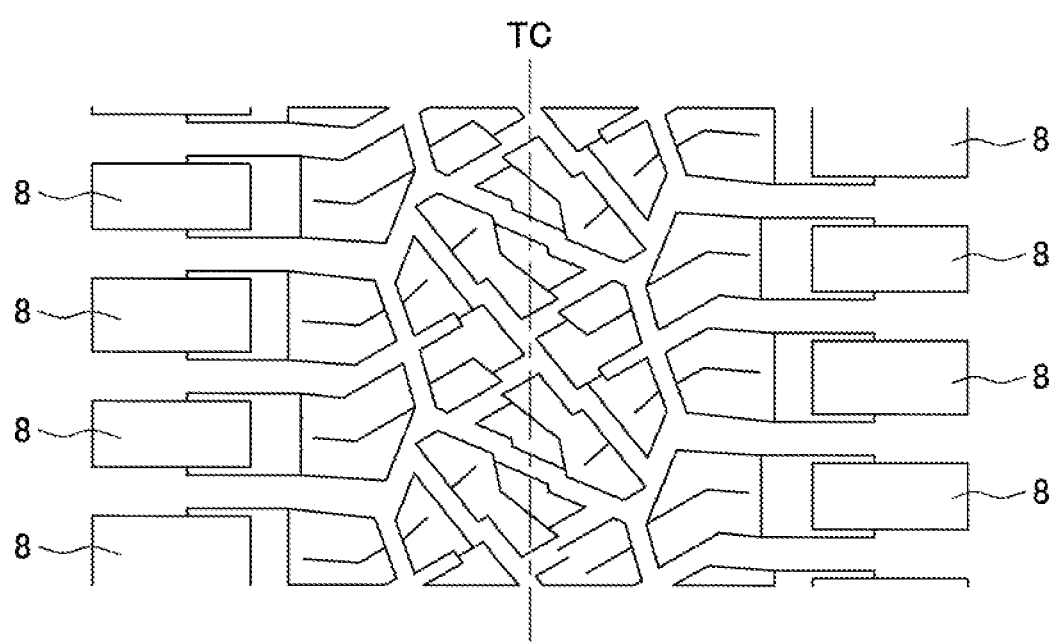
FIG. 5 is a development view in a plan view in a tire according to a comparative example.

The pneumatic tire having the configuration described in the embodiment mentioned above was set to a working example. Further, the pneumatic tire having the same configuration as the working example except the configuration of the projection of the side wall portion was set to the comparative example. In the comparative example, the projections 8 having the same shape are uniformly arranged in the side wall portion as shown in FIG. 5. The projection 8 is the same as the first projection 21 shown in the embodiment mentioned above except a point that the angle of the side surface is 90 degrees in relation to the surface of the side wall portion.

TABLE 1

| Configuration | Comparative example FIG. 5 | Working example FIG. 2 |
| --- | --- | --- |
| Angle θ1 (degree) | 90 | 120 |
| Angle θ2 (degree) | 90 | 90 |
| Punishing road traveling property | 100 | 90 |
| Dynamic unbalance | 100 | 90 |

From Table 1, it is known that the punishing road traveling property is improved and the dynamic unbalance is reduced in the working example in comparison with the comparative example.

What is claimed is:
1. A pneumatic tire comprising:
a pair of bead portions;
side wall portions which extend outward in a tire diametrical direction from the bead portions; and
a tread portion which is connected to an outside end in the tire diametrical direction of each of the side wall portions,
wherein the tread portion is provided with a first block and a second block, which protrudes outward in a tire width direction more than the first block, alternately in a tire circumferential direction in a shoulder region,
wherein the side wall portion is provided with a first projection which is provided in an outer side in the tire width direction of the first block, and a second projection which is provided in an outer side in the tire width direction of the second block,
wherein each of the first projection and the second projection extends in the tire diametrical direction,
wherein an outside end in the tire diametrical direction of the second projection is connected to a side surface of the second block and is arranged closer to an outer side in the tire diametrical direction than an outside end in the tire diametrical direction of the first projection,
wherein an angle θ1 formed by a side surface of the first projection and a surface of the side wall portion is larger than an angle θ2 formed by a side surface of the second projection and the surface of the side wall portion,
wherein the tread portion includes a ground-contacting surface on an outermost side in the tire diametrical direction,
wherein an outer edge of the ground-contacting surface of the second block in the tire width direction is arranged closer to the outer side in the tire width direction than an outer edge of the ground-contacting surface of the first block in the tire width direction, wherein the outside end of the first projection in the tire diametrical direction is arranged closer to the inner side in the tire diametrical direction than the outer edge of the ground-contacting surface of the first block in the tire width direction, and wherein the outside end of the second projection in the tire diametrical direction is arranged closer to the inner side in the tire diametrical direction than the outer edge of the ground-contacting surface of the second block in the tire width direction.

2. The pneumatic tire according to claim 1, wherein the outside end in the tire diametrical direction of the first projection has the same height as a groove bottom of a lateral groove which comparts the first block, or is positioned closer to an inner side in the tire diametrical direction than the groove bottom.

3. The pneumatic tire according to claim 1, wherein the outside end in the tire diametrical direction of the second projection is positioned closer to an inner side in the tire diametrical direction than a surface of the second block.

4. The pneumatic tire according to claim 1, wherein an inside end in the tire diametrical direction of the second projection is positioned closer to an outer side in the tire diametrical direction than an inside end in the tire diametrical direction of the first projection.

5. The pneumatic tire according to claim 1, wherein the angle θ1 is between 110 and 135 degrees, and the angle θ2 is between 80 and 110 degrees.

6. The pneumatic tire according to claim 1, wherein a difference between the angle θ1 and the angle θ2 is equal to or more than 10 degrees.

7. The pneumatic tire according to claim 1, wherein a difference between the angle θ1 and the angle θ2 is equal to or more than 20 degrees.

8. The pneumatic tire according to claim 1, wherein a cross section of the first projection is formed into a trapezoidal shape which is widened toward a surface of the side wall portion.

9. The pneumatic tire according to claim 1, wherein each of an inside end in the tire diametrical direction of the first projection and an inside end in the tire diametrical direction of the second projection is arranged closer to an outer side in the tire diametrical direction than a tire maximum width position.

10. The pneumatic tire according to claim 1, wherein a difference between a height H1 of the first projection and a height H2 of the second projection on the basis of a surface of the side wall portion is equal to or less than 2.5 mm.

11. The pneumatic tire according to claim 1, wherein a difference between a width W1 of the first projection and a width W2 of the second projection in a tire circumferential direction is equal to or less than 5.0 mm.

12. The pneumatic tire according to claim 1, wherein cross sectional shapes of the first projection and the second projection are flat, wherein a width W1 of the first projection in a tire circumferential direction is greater than a height H1 of the first projection on the basis of a surface of the side wall portion, and wherein a width W2 of the second projection in the tire circumferential direction is greater than a height H2 of the second projection on the basis of the surface of the side wall portion.

13. The pneumatic tire according to claim 1, wherein a distance D1 in the tire diametrical direction between the outside end in the tire diametrical direction of the first projection and the outside end in the tire diametrical direction of the second projection is between 3.0 and 20.0 mm.

14. The pneumatic tire according to claim 1, wherein a distance D2 in the tire diametrical direction between the inside end in the tire diametrical direction of the first projection and the inside end in the tire diametrical direction of the second projection is between 3.0 and 20.0 mm.

15. The pneumatic tire according to claim 1, wherein a difference between a distance D1 and a distance D2 is equal to or less than 10.0 mm, wherein the distance D1 is a distance in the tire diametrical direction between the outside end in the tire diametrical direction of the first projection and the outside end in the tire diametrical direction of the second projection, and wherein the distance D2 is a difference in the tire diametrical direction between an inside end in the tire diametrical direction of the first projection and an inside end in the tire diametrical direction of the second projection.

16. The pneumatic tire according to claim 1, wherein a diametrically outermost ground-contacting surface of the second block protrudes outward in the tire width direction more than a diametrically outermost ground-contacting surface of the first block.

17. The pneumatic tire according to claim 1, wherein an outer side surface of the second projection has a substantially continuous curvature along its entire diametrical length.

18. The pneumatic tire according to claim 1, wherein an outer side surface of the second projection has a continuously outwardly-convex curvature along its entire diametrical length.

* * * * *